Nov. 12, 1963  B. STERNLICHT  3,110,526

BEARING SUPPORT

Filed Oct. 12, 1961

*Inventor*
*Beno Sternlicht*
by
*His Attorney*

United States Patent Office 3,110,526
Patented Nov. 12, 1963

3,110,526
BEARING SUPPORT
Beno Sternlicht, Schenectady, N.Y., assignor to General Electric Company, a corporation of New York
Filed Oct. 12, 1961, Ser. No. 144,655
8 Claims. (Cl. 308—26)

The present invention relates to yieldable bearing supports, and more particularly, to noise-attenuating bearing constructions employing yieldable bearing supports.

In rotating machines, the rotor usually is the major source of noise generation. Noise-causing vibration forces are normally transmitted from the rotor through the bearing supports to adjoining apparatus and members. In installations such as naval vessels, especially submarines, dissemination of machinery noise is intolerable, and extensive consideration must be given to attenuating the noise generated.

The nature of the noise-generating forces may be synchronous whirl which is orbital rotor axis movement at shaft rotational frequencies and may be due to unbalance in the rotor, thermal distortion, electrical and magnetic fields acting on the rotor, or other forces peculiar to the rotor application and its environment, for example, turbine bucket vibration. Other vibrations may be at half rotational frequency; this may be the well-known, half-frequency whirl normally experienced on lightly loaded shafts. There is also the condition known as resonant whip which is an instability excited by the first rotor bending critical frequency of the system (rotor, bearings, etc.). Resonant whip is a function of the first critical speed of an apparatus and usually occurs at twice the first rotor bending critical frequency of the system.

Recognizing that the primary noise source is the rotor of an apparatus, it is desirable to attenuate much of the noise as near the rotor as possible before it transmitted to supporting structures where it may excite other members and become more difficult to control. It is, therefore, clear that the bearing support is a desirable area to employ noise control means. Preliminary indications are that for maximum noise attenuation, the bearing should have extremely low stiffness and high damping qualities. However, optimization of bearing support design requires that resonant whip be taken into account. Since resonant whip is identified with the first critical speed, it becomes extremely problematic if it occurs at low speeds in soft bearing supports.

The chief object of the present invention is to provide an improved bearing support.

Another object of the invention is to provide a bearing support having improved noise dampening characteristics.

A further object is to provide a bearing support having improved noise dampening and bearing stiffness characteristics.

These and other objects of my invention may become more readily perceived from the following description.

One of the features of my invention is a bearing construction including a plurality of chambers circumferentially disposed around bearing means, each chamber having at least one yieldable wall associated with the bearing means whereby upon compression of a fluid within the chamber, the fluid may be displaced circumferentially through connecting passages to immediately adjacent chambers to substantially attenuate the force transmitted.

The attached drawings illustrate preferred embodiments of my invention, in which.

Figure 1:
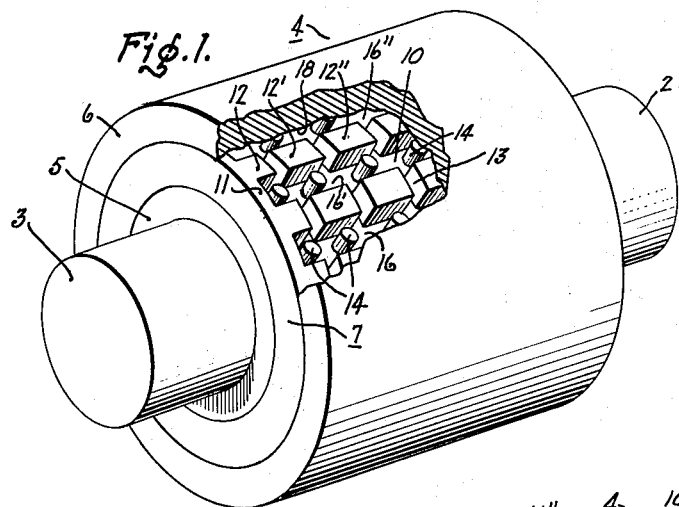
FIGURE 1 is a perspective view, partially in section, illustrating an apparatus practicing the present invention.

Referring to the drawings in more detail, there is shown in FIGURE 1, a perspective view, partially in section, of a bearing construction for practicing the present invention wherein rotor 2 is provided with journal portion 3 adapted to be supported by bearing construction 4. Bearing construction 4 in the present embodiment may comprise cylindrical bearing 5 which is shown as a journal bearing, however, it will be appreciated that ball bearings or other roller bearing type members may be utilized while still practicing the present invention. Bearing 5 may be enveloped by a suitable rigid annular housing member 6 which may comprise a portion of a bearing pedestal or other portion of an apparatus in which the rotor is to be supported. Resilient member 7 may be located between bearing 5 and rigid annular member 6. From the fragmentary sectional view shown, it is noted that the structure includes circumferentially disposed and connected chamber constructions.

Figure 2:
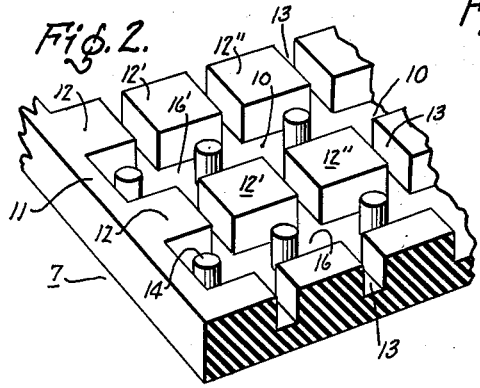
FIGURE 2 is an enlarged, developed, fragmentary, sectional view of the resilient member shown in FIGURE 1.

FIGURE 2 is an enlarged, developed, fragmentary view of the resilient member illustrated in FIGURE 1. In FIGURES 1 and 2, resilient member 7 may comprise base member 10 which is adapted to be mounted upon bearing 5. Extending from this base portion are boundary portions 11 which define the ends of the resilient member and extending between these boundary portions may be separating portions 12, 12', and 12", etc. In this particular embodiment, it is noted that these partition portions are circumferentially spaced around the bearing construction to define a plurality of chambers 16. It can be seen that chambers 16, 16', 16" which lie circumferentially about the bearing are defined by end boundary portions 11, base portion 10, partition members 12, 12', 12", etc., and also inner surface 18 of outer annular rigid member 6. Chambers 16, 16', etc., may be provided with connecting means, namely passages 13 lying between members 12, 12', etc., which, if desired, may be sized to constitute flow restraining means. If desired, suitable orifice constructions may further be included in passages 13. Chambers 16, 16', 16", etc., may be provided with resilient post members 14 which in effect support the chamber against bearing forces tending to distort the chambers.

Figure 3:
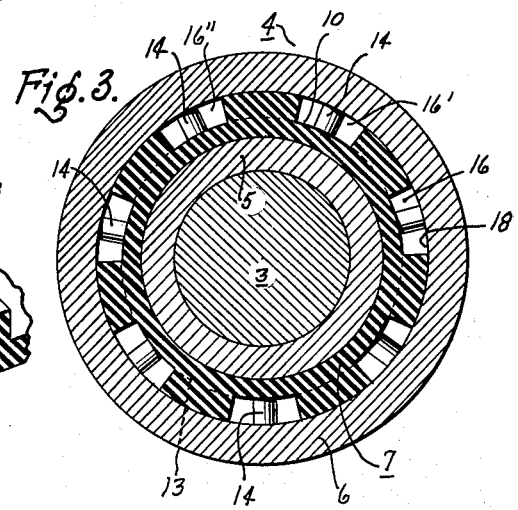
FIGURE 3 is a sectional view taken in a plane normal to the rotor axis shown in FIGURE 1.

In FIGURE 3, there is shown a sectional view taken in a plane passing normal to the rotor axis. It can be seen that the circumferentially located chambers are connected by the previously noted passages 13 and by this construction the rotor and bearing are supported by the resilient member and the fluid in the chambers. This fluid may be a non-compressible liquid or a compressible fluid such as a dimethyl-silicone.

As initially mentioned, the noise generation from a steam turbine, generator, or similar rotating equipment, may be caused by the whirling motion of the rotor axis, at synchronous speed and at half-synchronous speed frequencies. The rotor axis may move or tend to move orbitally with respect to the bearing support and this movement may cause undesirable noises to be transmitted to the bearing pedestal and adjacent members. It is also recognized that a system having ideal damping qualities for absorbing the energy from such orbital motion may be unduly soft for supporting the rotor in the sense that the system is susceptible to resonant whip, which phenomenon may occur as a result of the low first critical speed of the system. It is accordingly desirable to provide a bearing construction having noise damping qualities and at the same time provide stability against resonant whip.

In the embodiment of the invention shown in FIGURES 1, 2, and 3, the bearing illustrated is of a conventional journal bearing design. It will be appreciated that other bearing constructions such as rolling element bearings, may be utilized. The immediate bearing support member, specifically member 5 in FIGURES 1, 2, and 3, is substantially surrounded by a resilient member which has associated therewith fluid damping means which includes a plurality of circumferentially located chambers 16, 16', 16", in which may be located a suitable damping fluid. During operation, as the rotor axis tends to follow an orbital path, the resilient member tends to comply with the orbital path and is deflected and compressed. Accordingly, the walls that define the chambers tend to yield in response to the bearing forces to distort chambers 16 and to displace and/or compress the fluid in the chambers. This compression and displacement comprises energy absorbing means and very specifically, the noise attenuating means of the present invention. In FIGURES 1, 2, and 3, the fluid in chambers 16, 16', 16", etc., tends to be displaced circumferentially in directions from the areas of immediate compression due to the orbital movement of the rotor and the fluid is forced through passages 13 which connect adjacent circumferentially located chambers. The fluid may be restrained from movement between chambers by suitably sizing the passages or providing separate flow restricting means. In this manner, the orbital movement of the rotor which is transmitted through the bearing is passed to the resilient member with its fluid chamber construction and the fluid absorbs the energy to a great extent by the impeded circumferential movement of the fluid from chamber to chamber. In keeping with the need for substantial stiffness in the bearing construction, in addition to the damping effects, the present invention utilizes post members 14, partition portions 12, 12', etc., and end portions 11 to restrain the collapse of chambers 16, 16', etc. and to provide substantial stiffness in bearing support. By properly determining the size of the chambers, connecting passages, damping fluid, members 12, and post members 14, a construction having the desired stiffness and damping qualities may be achieved.

Figure 4:
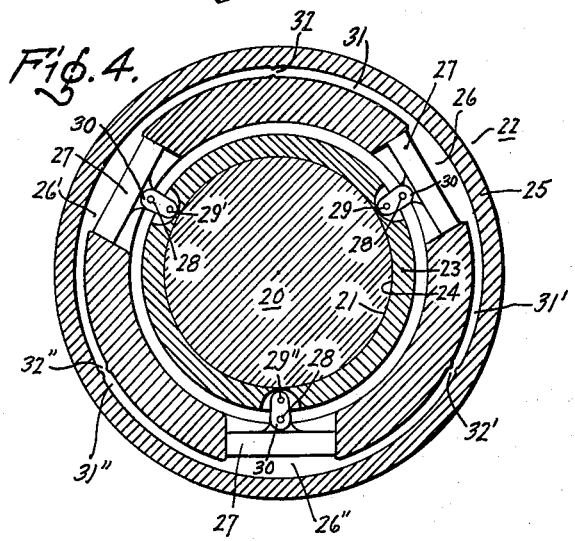
FIGURE 4 is a sectional view of another embodiment of the present invention.

In FIGURE 4 there is shown another embodiment of the invention wherein the circumferentially located chambers are not formed of a resilient material but rather the yieldable wall of each chamber comprises a piston which is permitted to move radially in a chamber which is connected to the adjacent chambers having similar constructions. In this particular manner, some of the advantages of the invention shown in FIGURES 1, 2, and 3 may be achieved without the use of an intermediate resilient member between the bearing and the rigid outer support.

In FIGURE 4, rotor 20 having journal surface 21 is supported in bearing construction 22 having a bearing 23 with bearing surface 24 adapted to engage surface 21. For mounting the particular bearing in this particular embodiment, three or more desired pivot points 29, 29', 29" may be utilized.

Bearing construction 22 may include outer annular member 25 which is associated with a bearing pedestal or other stationary support means. Member 25 may be provided with suitable chambers or cylinders 26. These cylinders may be annularly disposed about the rotor at equal angular intervals and may have associated therewith pistons 27 which are connected to bearing 23 and are adapted to move radially with respect to the rotor axis. Adjacent chambers are connected by circumferentially extending passages 31, 31' and 31", which, if desired, may include suitable flow restraining means 32, 32', and 32". From this construction, it will be noted that a plurality of circumferentially located chambers are connected by conduit means so that fluid may pass in a circumferential direction from chamber to chamber. The stiffness of the bearing support is determined by the fluid utilized in the system. The size of passages 31 and whether flow restraining means 32 are utilized determines the damping qualities of the construction.

In order to contain the orbital movement of the rotor as set forth above, each cylinder is associated with a portion of bearing 23, that is, piston 27 has a pivot connection 28 which is connected to pivot connection 29 on the bearing member by means of link 30. This construction is duplicated in cylinders 26' and 26", respectively, and it will be noted that orbital movement of the rotor causes the transmission of a force through the link and pivot point connections 28, 29, and 30 to the respective pistons. In the event that fluid in chamber 26 is compressed, it tends to flow circumferentially through passages 31 and 31" to chambers 26' and 26". In this manner, the fluid in the system passing through the passages and orifices absorbs noise producing energy caused by vibration in the system and the stiffness of the system may be retained by judicious selection of a damping fluid. The passage sizes for passages 31, 31' and 31" and the size of orifices 32, 32', 32" determines the damping qualities of the construction. It will be appreciated that if desired, suitable restraining means may be supplied in the chamber, for example, springs (not shown).

The present invention provides a plurality of circumferentially located chambers operatively associated with a bearing construction. The circumferentially located chambers are connected by passage means and a suitable damping fluid when used with the construction provides a structure having desired damping and bearing stiffness characteristics.

While I have described preferred embodiments of my invention, it will be understood that the invention is not limited thereto since it may otherwise be embodied within the scope of the following claims.

What I claim as new and desire to secure by Letters Patent of the United States is:

1. In a bearing construction, the combination of bearing means, means defining a plurality of chambers adapted for containing fluid and disposed about said bearing means, each of said chambers having a yieldable wall operatively associated with the bearing means and conduit means for connecting adjacent chambers whereby the compression of fluid in a chamber causes the fluid to be displaced circumferentially to an adjacent chamber.

2. In a bearing construction, the combination of bearing means, means defining a plurality of chambers adapted for containing fluid and disposed about said bearing means, each of said chambers having a yieldable wall operatively associated with the bearing means and conduit means for connecting adjacent chambers whereby the compression of fluid in a chamber causes the fluid to be displaced circumferentially to an adjacent chamber, and resilient means for supporting the yieldable walls of the chambers.

3. In a bearing construction, the combination of bearing means, means defining a plurality of chambers adapted for containing fluid and disposed about said bearing means, each of said chambers having a yieldable wall operatively associated with the bearing means, conduit means for connecting adjacent chambers whereby the compression of fluid in a chamber causes the fluid to be displaced circumferentially to an adjacent chamber, said conduit means including flow restricting means.

4. In a bearing construction, the combination of a substantially rigid bearing member, a substantially rigid annular member enveloping said bearing member, a resilient member located between the bearing member and the annular member, said resilient member defining a plurality of chambers adapted for containing fluid and connected by passage means, compression of the fluid within the chambers resulting in circumferential movement of the fluid through the passage means to adjacent chambers.

5. In a bearing construction, the combination of an annular bearing member, a substantially rigid annular member enveloping said bearing member, a resilient member located between the rigid member and the bearing member, said resilient member having a plurality of circumferentially disposed chambers adapted for containing fluid and with passage means extending therebetween, said passage means constituting flow restricting means whereby upon compression of fluid in the chambers the flow, which is circumferential to adjacent chambers through the passage means, is restrained.

6. In a bearing construction, the combination of a bearing member, a substantially rigid annular member enveloping said bearing member, a resilient member located between the bearing member and the annular member, said resilient member defining a plurality of circumferentially disposed chambers adapted for containing fluid and connected by passage means whereby compression of the fluid in a chamber causes circumferential movement of the fluid through the passages to adjacent chambers, and resilient means associated with each chamber for yieldably supporting said chambers from deformation.

7. In a bearing construction, the combination of bearing means, a plurality of chambers oriented about said bearing means and adapted for containing fluid, passage means connecting adjacent chambers, piston means associated with each of said chambers, said pistons being operatively associated with said bearing means whereby movement of said bearing means causes the pistons to displace fluid from said chambers, said fluid moving circumferentially to adjacent chambers to maintain support of the bearing means.

8. The bearing construction according to claim 7 further including flow restricting means located in said passages.

References Cited in the file of this patent
UNITED STATES PATENTS

| | | |
|---|---|---|
| 1,416,988 | Sherwood | May 23, 1922 |
| 2,614,896 | Pierce | Oct. 21, 1952 |

FOREIGN PATENTS

| | | |
|---|---|---|
| 1,187,749 | France | Mar. 9, 1959 |